Figure 1:
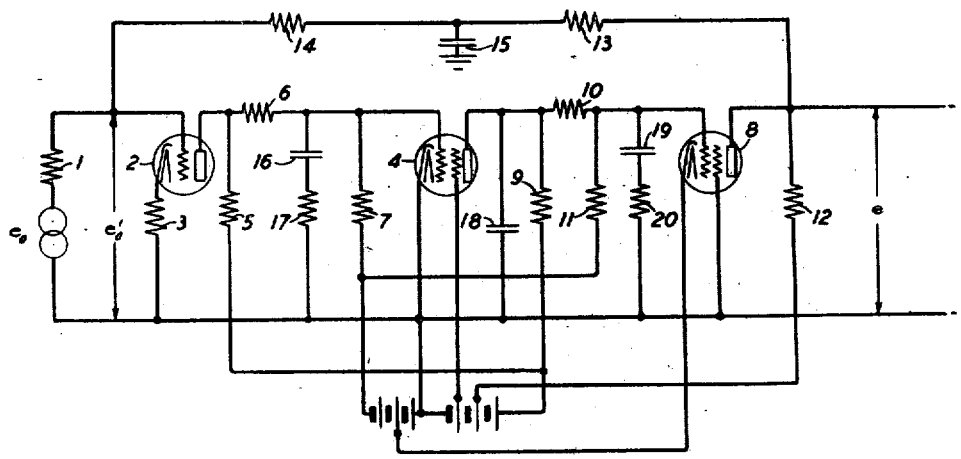

Dec. 10, 1946.  H. G. OCH ET AL  2,412,227
ELECTRICAL DIFFERENTIATOR
Filed May 1, 1941

INVENTORS: H.G.OCH
K.D.SWARTZEL JR.
BY
*W.D.Dawson*
ATTORNEY

Patented Dec. 10, 1946

2,412,227

UNITED STATES PATENT OFFICE 2,412,227

ELECTRICAL DIFFERENTIATOR

Henry G. Och, West Englewood, and Karl D. Swartzel, Jr., Teaneck, N. J., assignors to Bell Telephone Laboratories, Incorporated, New York, N. Y., a corporation of New York Application May 1, 1941, Serial No. 391,332

3 Claims. (Cl. 178—44)

This invention relates to electrical measuring circuits and particularly to an electrical network for deriving a function of the input voltage.

The object of the invention is an electrical network for continuously deriving the differential or time derivative of the input voltage.

A feature of the invention is the use of a reverse feedback circuit associated with a linear amplifier in such manner as to produce in the output of the amplifier a voltage varying as the differential of the input voltage.

In many measuring devices, such as artillery predictors, airplane bomb sights, vibration measuring devices and many others, it is necessary to obtain the rate of change of some measurable quantity. In accordance with the present invention this measurable quantity is expressed as a variable electrical voltage which is applied to the input of an electrical network. The network modifies the applied voltage to produce in the output circuit a voltage varying in accordance with the rate of change or differential of the input voltage, and, in some cases, a voltage varying directly with the input voltage.

Figure 2:
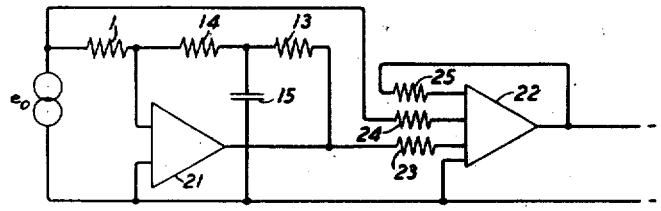

In the drawing:

Fig. 1 diagrammatically shows an electrical network embodying one aspect of the invention; and Fig. 2 shows the network of Fig. 1 modified to produce a pure differential voltage.

The voltage to be analyzed is conventionally designated by the voltage source $e_0$, and is applied to the input of the network through a resistor 1. This voltage is applied directly to the control electrode, or grid of the first vacuum tube 2, which may have a conventional grid biasing resistor 3 in the cathode circuit. The vacuum tube 2 is coupled to the vacuum tube 4 by the known network comprising the resistors 5, 6 and 7. The vacuum tube 4 is similarly coupled to the vacuum tube 8 by means of the known network comprising the resistors 9, 10 and 11. The output of the vacuum tube 8 is supplied to the load resistor 12 and is available as a voltage appearing across this resistor. Power is fed back from the anode of the vacuum tube 8 to the control electrode, or grid of the vacuum tube 2 through the serially connected resistors 13 and 14. A capacitor 15 is connected from the junction of the resistors 13 and 14 to ground, that is, effectively to the cathode circuits of the vacuum tubes.

The capacitors 16 and 19, respectively in serial relationship with the resistors 17 and 20 in shunt to the input circuits of the vacuum tubes 4 and 8, and the capacitor 18 in shunt to the output circuit of the vacuum tube 4 assist in maintaining the proper phase relationships in the amplifier so that the output voltage of the amplifier will accurately represent the desired value.

In the following equations let $e_0$ = the voltage to be analyzed,
$e$ = the output voltage,
$R_1$ = the resistance of resistor 1,
$R_2$ = the resistance of resistor 12,
$R$ = the resistance of resistor 13 or 14,
$C$ = the capacitance of capacitor 15,
$S$ = the change of the plate current of vacuum tube 8 due to a unit voltage applied to the grid of vacuum tube 2, that is, the over-all transconductance of the complete amplifier.

Using the principles set forth in U. S. Patent 2,102,671, December 21, 1937, H. S. Black, it can be shown that $$e = e_0\left(\frac{2R}{R_1}\right)\left(1+\frac{RC}{2}p\right)\left(\frac{\mu\beta}{1+\mu\beta}\right)\left(1-\frac{1}{2SR\left(1+\frac{RC}{2}p\right)}\right) \quad (1)$$

where $\mu\beta$ is the gain around the feedback loop and is equal to $$\frac{S}{\frac{1}{R_1}\left(1+\frac{R}{R_2}\right)+\frac{1}{R_2}\left(1+\frac{R}{R_1}\right)+pC\left(1+\frac{R}{R_2}\right)\left(1+\frac{R}{R_1}\right)} \quad (2)$$

When the gain around the feedback loop is large, say 1000, the last two members of the gain equation are very nearly unity and the gain can be expressed as $$e \doteq e_0\left(\frac{2R}{R_1}\right)\left(1+\frac{RC}{2}p\right) = \left(\frac{2R}{R_1}\right)e_0 + \left(\frac{R^2C}{R_1}\right)pe_0 \quad (3)$$

But $p$ is the common mathematical operator indicating differentiation with respect to time and, therefore, the output voltage $e$ includes a component proportional to $e_0$ and a component proportional to the time derivative or differential of $e_0$.

By a suitable choice of the circuit elements $R_1$, $R$ and $C$, and providing the gain around the feedback loop is large, it is evident from Equation 3 that the absolute, as well as the relative, values of the signal component $$\left(\frac{2R}{R_1}\right)e_0$$

and the differential component $$\left(\frac{R^2C}{R_1}\right)pe_0$$

may be controlled within a certain range, but, as a practical matter, the signal component cannot be made equal to zero, so as to give a pure differential component. However, this result may be obtained, as shown in Fig. 2, by cancelling out the signal component.

In Fig. 2, the amplifier 21 represents the linear amplifier of Fig. 1, and circuit elements having reference characters similar to those in Fig. 1 have similar functions. The output of the network 21 is supplied through a resistor 23, to a summing amplifier 22, of the type disclosed in U. S. application Serial No. 391,331, to K. D. Swartzel, Jr., filed of even date herewith. The summing amplifier 22 has a feedback path through the impedance 25, and will produce in its output circuit a voltage proportional to the algebraic sum of the voltages supplied to the input circuit. Signal voltage from the source $e_0$ is supplied directly through the resistor 24 to the input of the summing amplifier 22. As the network 21 includes an odd number of vacuum tubes in cascade, the signal voltage supplied by the network 21 to the summing amplifier 22 is reversed in phase with respect to the signal voltage supplied through the resistor 24.

Let $R_1$=resistance of resistor 1,
$R_{13}$=resistance of resistor 13,
$R_{14}$=resistance of resistor 14,
$R_{23}$=resistance of resistor 23,
$R_{24}$=resistance of resistor 24.

Then if $$\frac{R_{13}+R_{14}}{R_1}=\frac{R_{23}}{R_{24}}$$

the signal voltages supplied to the input of the summing amplifier 22 will just cancel each other, and the output of the summing amplifier 22 will contain only the differential component.

It will generally be found that the capacitor 15 has a certain amount of leakage resistance, which may be considered as a resistor of suitable value in shunt with the capacitor 15, which will tend to produce a component of signal voltage in the output of the amplifier 21, and thus change the relative values of signal voltage and differential voltage in the output, compared to the values given by a perfect capacitor. By suitable choice of the values of the resistors $R_1$, $R_{13}$, $R_{14}$, $R_{23}$, $R_{24}$, $R_{25}$, and the capacitor $C_{15}$, the relative values of signal voltage and differential voltage may be made to approximate the values obtained with a perfect capacitor.

By connecting a number of the circuits shown in Fig. 2 in tandem, it is obvious that the second, or higher, differentials of the signal voltage may be obtained.

In a typical embodiment of the invention, the resistor 1 was 4 megohms, the resistor 3 was 1500 ohms, the resistors 5, 6, 7, 9, 10, 11 were respectively ½, ¾, 2, ¼, 1¼ and 1 megohms, the resistor 12 was 6000 ohms, the resistors 13 and 14 were each 2 megohms, and the resistors 17 and 20 were each 100,000 ohms. The capacitors 15, 16, 18, 19 were respectively 1, .001, .0001, .03 microfarads. The vacuum tubes 2, 4, 8 were commercial vacuum tubes respectively designated by the trade-names 6SC7, 6SJ7 and 6Y6G. A 700-volt battery, grounded at the mid-point, was used, +350 volts being applied to the anodes of tubes 2 and 4, +250 volts to the anode of tube 8, +75 volts to the screen grid of tube 4, ground or zero volts to the cathode of tube 4 and the screen grid of tube 8, −135 volts to the cathode of tube 8 and −350 volts to the grid of tube 4.

What is claimed is:

1. In combination, a source of voltage to be analyzed, a linear amplifier having an input and an output circuit, a first resistor in serial relationship with said source connected to the input circuit of said amplifier, and a feedback path from said output circuit to said input circuit including two resistors connected in serial relationship in said path, and a capacitor connected from the junction of said resistors in shunt to said path, whereby the output of said amplifier contains components corresponding to the voltage from said source, and to the differential or time derivative of said voltage, a second linear amplifier having an input and an output circuit, a fourth resistor in serial relationship with the output circuit of said first amplifier and the input circuit of said second amplifier, a feedback path from the output circuit to the input circuit of said second amplifier, and a fifth resistor in serial relationship with said source connected to the input circuit of said second amplifier.

2. The combination in claim 1 in which the ratio of the sum of said two resistors to said first resistor equals the ratio of said fourth resistor to said fifth resistor.

3. The method of producing a voltage varying with the rate of change of a signal voltage, which comprises amplifying said signal voltage, feeding back a portion of said amplified voltage of such magnitude and phase as to produce a component of voltage varying with the rate of change of said signal voltage, supplying said amplified signal voltage and said component to a utilization circuit, and supplying to said utilization circuit signal voltages of reversed phase to neutralize the amplified signal voltage in said utilization circuit.

HENRY G. OCH.
KARL D. SWARTZEL, Jr.